P. W. MURPHY.
REVERSING MECHANISM.
APPLICATION FILED JULY 8, 1918.
1,379,774.
Patented May 31, 1921.
2 SHEETS—SHEET 2.
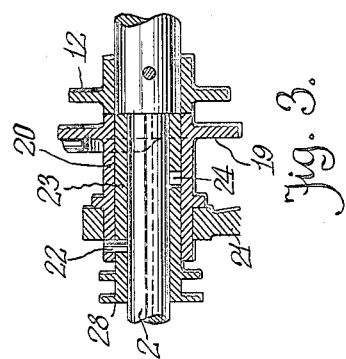
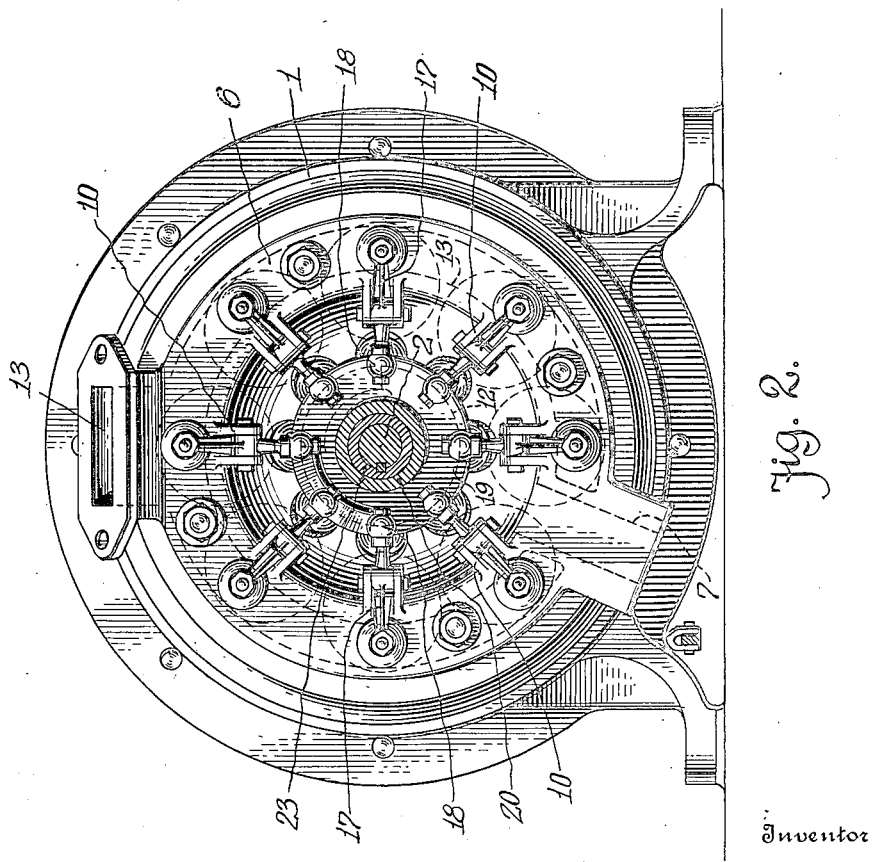

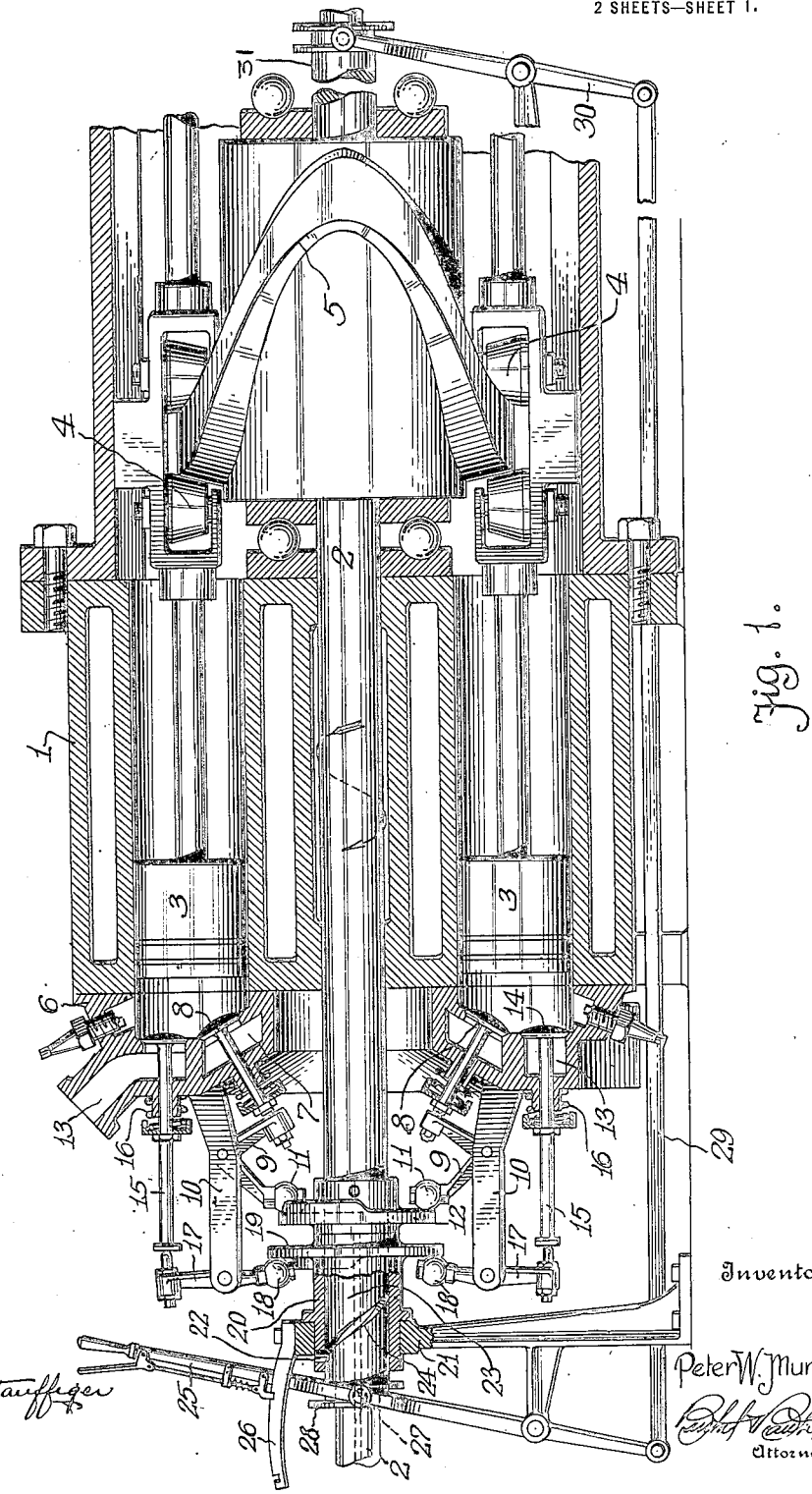

UNITED STATES PATENT OFFICE.

PETER W. MURPHY, OF CHICAGO, ILLINOIS, ASSIGNOR TO MURPHY ENGINEERING CO., OF DETROIT, MICHIGAN, A CORPORATION OF MICHIGAN.

REVERSING MECHANISM.

1,379,774.                Specification of Letters Patent.     Patented May 31, 1921.

Application filed July 8, 1918. Serial No. 243,810.

*To all whom it may concern:*

Be it known that I, PETER W. MURPHY, a citizen of the United States of America, residing at Chicago, in the county of Cook and State of Illinois, have invented certain new and useful Improvements in Reversing Mechanism, of which the following is a specification, reference being had therein to the accompanying drawings.

This invention relates to a reversing valve gear for explosive engines of the type wherein there is inter-rotation between the shaft and cylinders and to an arrangement thereof whereby the engine is easily controlled to turn in either direction, and whereby the timing of the valves may be adjusted as desired.

The invention consists in the matters hereinafter set forth, and more particularly pointed out in the appended claims.

In the drawings,

Figure 1 is a view in longitudinal section, partially broken away and in elevation, of an engine equipped with a valve gear that embodies features of the invention;

Fig. 2 is a view in end elevation of the valve gear and engine, with parts omitted, and Fig. 3 is a view in detail of one form of valve stem.

Referring to the drawings, an engine of the type wherein a set of cylinders 1 is journaled concentrically around a main shaft 2 so that there is inter-rotation of the parts caused by the thrust of the pistons 3 through suitable cam engaging devices 4 against a cam block 5, has a valve head 6 common to all cylinders.

A fuel intake passage 7 common to all of the cylinders discharges through the valve seats controlled by puppet valves 8, each spring projected against a bell crank 9 mounted on a suitable standard 10 with a cam roll 11 thereon bearing against a cam disk 12 secured to the main shaft 2 to operate the valves in timed relation to the several piston strokes.

An exhaust passage 13 common to all of the cylinders receives the exhausted gases through ports controlled by puppet valves 14, the stems 15 of which are each projected by a suitable spring 16 or the like against a lever 17 on the standard 10, carrying a cam roll 18 that bears against a cam disk 19.

A sleeve hub 20 of the latter cam 19 is rotatably secured on the main shaft 2, as between a suitable bearing 21 and the cam 12, with an inner projection or stem 22 traveling in a cam groove 24 of a shifting bushing 23 that is non-rotatable and longitudinally reciprocable on the shaft. The bushing may be reciprocated on the shaft by a suitable manually operated member, such as a lever 25 interlocking with a quadrant 26 and having a yoke with studs 27 engaging into a peripherally grooved flange 28 on the shifting bushing. Where the engine has two opposed sets of cylinders operating on the same cam, a similar valve mechanism is arranged for the other set of cylinders, and cross link 29 throws a second cam lever 30 which reciprocates a shifting bushing 31 to set a cam, not shown, similar to the cam 19.

In operation, the valve cams are so set in relation to each other, when the lever is at one end of its throw, for instance as indicated in Fig. 1, that the exhaust valve of each cylinder opens at approximately three quarters of the cam cycle after the explosion stroke period of the inlet valves, the exact relation depending on any " lap " that may be given the valves, with the result that the engine turns as indicated by the arrows A. When it is desired to have the engine turn in a reverse way, the proper manipulation of the shifting lever throws the exhaust cam back 180 degrees plus whatever is necessary to give the desired " lap " so that the exhaust takes place on the other side, relatively speaking, of the inlet valve action and causes the reversal of the engine. It is to be understood that the valves may be transposed in position in the cylinder head, that is, the exhaust valves may be on the inside and the inlet valves on the outside, and that the operating connections between the cams and valves may be of any preferred type which causes the necessary action of the valves while providing for adjustment, take-up for wear and the like.

As a result of this construction, a reversal action is obtained for the engine by means positive in action, which causes change of direction of rotation by the simple movement of a single member.

Obviously, changes in the details of construction may be made without departing from the spirit of my invention and I do not care to limit myself to any particular form or arrangement of parts.

What I claim is:—

1. In an explosive engine of the type described, a main shaft, a set of cylinders arranged around the shaft, pistons for the cylinders connected to the shaft to cause interrotation of the shaft and set of cylinders, a cam fixed on the shaft for operating the intake valves to the cylinders in timed relation to the piston movement, and a cam adjustable on the shaft to operate the exhaust valves to the cylinders at either side of the intake valves.

2. In an explosive engine of the type described, a main shaft, a set of cylinders arranged around the shaft, pistons for the cylinders connected to the shaft to cause interrotation of the shaft and set of cylinders, a set of intake valves on the cylinders, a cam fixed on the shaft adapted to operate the intake valves in timed relation to the piston movement, a set of exhaust valves for the cylinders, a cam oscillatory on the shaft adapted to operate the exhaust valve, and means to shift the exhaust valve cam to operate the companion valves on either side of the throw of the intake valve.

3. In an explosive engine, a main shaft, a set of cylinders arranged around the shaft, pistons for the cylinders, a cam on the shaft operatively connected to the pistons to cause interrotation between the cylinders and shaft, a set of puppet valves controlling the inlet to the cylinders, a set of levers for depressing the valves, a cam fixed on the shaft for operating the levers successively, a set of exhaust puppet valves for the cylinders, a set of levers for operating the exhaust valves, a cam secured on the shaft for operating the levers of the exhaust valves, and means for shifting the position of the exhaust valve cam on the shaft whereby the exhaust valves may be made to operate on either side of the intake valves.

4. In an explosive engine of the type described, a main shaft, a set of cylinders arranged around the shaft, pistons for the cylinders connected to the shaft to cause interrotation of the shaft and set of cylinders, a valve head common to all of the cylinders provided with an intake passage and an exhaust passage, a set of inlet puppet valves controlling communication between the intake passage and the cylinders selectively, a cam secured to the shaft and operatively connected to the valves to move them in timed relation to the piston movement of the respective cylinders, a set of exhaust puppet valves controlling communication between the exhaust passage of the valve head and the cylinders, a cam on the shaft for operating the exhaust valves, a sleeve on which said cam is mounted, arranged to shift the cam to throw the exhaust valves on either side of the intake valves throw, and means for shifting the sleeve.

5. In an engine of the character described, a shaft, a set of cylinders disposed around the shaft, an intake valve for each cylinder, a cam fixedly secured to the shaft for operating the intake valves in succession, an exhaust valve for each cylinder and means mounted so that it may be adjusted circumferentially on the shaft to operate the exhaust valves on either side of the intake valves.

6. In an explosive engine of the type described, a main shaft, a set of cylinders arranged around the shaft, pistons for the cylinders connected to the shaft to cause interrotation of the shaft and set of cylinders, a cam fixed on the shaft for operating the intake valves to the cylinders in timed relation to the piston movement, a sleeve slidably keyed to the shaft and a cam adjustable by said sleeve to operate the exhaust valves on either side of the intake valves to thereby determine the direction of rotation of the shaft.

7. In an explosive engine of the type described, a main shaft, a set of cylinders arranged around the shaft, pistons for the cylinders connected to the shaft to cause interrotation of the shaft and set of cylinders, a set of intake valves on the cylinders, a cam fixed on the shaft adapted to operate the intake valves in timed relation to the piston movement, a set of exhaust valves for the cylinders, a sleeve slidably keyed to the shaft and provided with a cam groove, a cam adapted to operate the exhaust valves and having a stud engaging the groove and means to move the sleeve axially of the shaft to thereby rotate the exhaust cam about the shaft.

8. An engine of the character described comprising a shaft, cylinders about the shaft, intake and exhaust valves for the cylinders, levers for operating said valves and cams on the shaft for operating said valves in successive timed relation, one of said cams being fixed and the other of said cams being adjustable relatively to the first mentioned cam circumferentially about the shaft to determine the direction of rotation of the shaft.

In testimony whereof 1 affix my signature in the presence of two witnesses.

PETER W. MURPHY.

Witnesses:
C. R. STICKNEY,
ANNA M. DORR.